United States Patent [19]
Guyard

[11] Patent Number: 5,012,044
[45] Date of Patent: Apr. 30, 1991

[54] ASSEMBLY INCLUDING A LIGHT ALLOY PROFILED MEMBER HAVING ONE OR MORE INSULATED ELECTRICAL CONDUCTORS AND PROCESS FOR FORMATION THEREOF

[75] Inventor: Jean-Claude Guyard, Le Croisic, France

[73] Assignee: Norsk Hydro a.s, Oslo, Norway

[21] Appl. No.: 399,484

[22] PCT Filed: Jan. 11, 1989

[86] PCT No.: PCT/NO89/00006
§ 371 Date: Nov. 8, 1989
§ 102(e) Date: Nov. 8, 1989

[87] PCT Pub. No.: WO89/06858
PCT Pub. Date: Jul. 27, 1989

[30] Foreign Application Priority Data
Jan. 12, 1988 [FR] France ............................ 88 00272

[51] Int. Cl.$^5$ .................... H01B 7/00; H01B 13/00; H02G 5/00; H01R 25/14
[52] U.S. Cl. ......................................... 174/98; 29/418; 29/848; 156/47; 191/23 R; 264/139; 439/110
[58] Field of Search ................ 174/48, 68.1, 68.2, 174/70 R, 70 B, 70 C, 96, 97, 98, 99 R, 99 B, 101, 117 FF, 129 B; 191/22 R, 23 R, 23 A, 28, 29 R; 439/110–122, 207–216; 29/418, 847, 848, 883, 884; 156/47, 50; 264/139, 272.11

[56] References Cited

U.S. PATENT DOCUMENTS

| | | | |
|---|---|---|---|
| 518,540 | 4/1894 | Banholzer | 191/23 R |
| 2,076,558 | 4/1937 | Hartman et al. | 191/23 R |
| 2,934,815 | 5/1960 | Stumbock | 29/418 X |
| 3,182,217 | 5/1965 | Quinn | 29/597 X |
| 3,603,918 | 9/1971 | Woertz | 439/117 X |
| 4,217,018 | 8/1980 | Yoshida et al. | 439/214 X |
| 4,342,144 | 8/1982 | Doguchi | 264/139 X |

FOREIGN PATENT DOCUMENTS

| | | | |
|---|---|---|---|
| 1253131 | 12/1960 | France | 191/23 A |
| 579813 | 9/1976 | Switzerland . | |

Primary Examiner—Laramie E. Askin
Attorney, Agent, or Firm—Wenderoth, Lind & Ponack

[57] ABSTRACT

An aluminum or aluminum alloy profiled section has one or more insulated electrical conductors. Such a profiled section includes at least one linear electrical conductor parallel to the profiled section, formed by the same material as the latter and insulated electrically in a solid insulating filling, a bare surface of the conductor and a bare surface of the filling being covered if required by a second insulating filling.

26 Claims, 1 Drawing Sheet

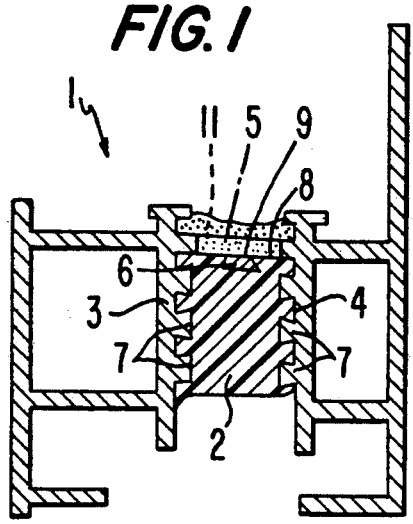
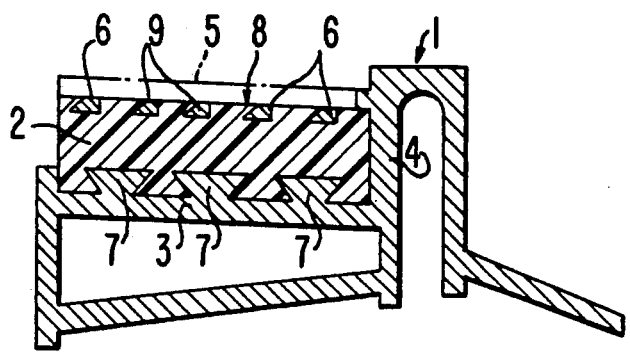
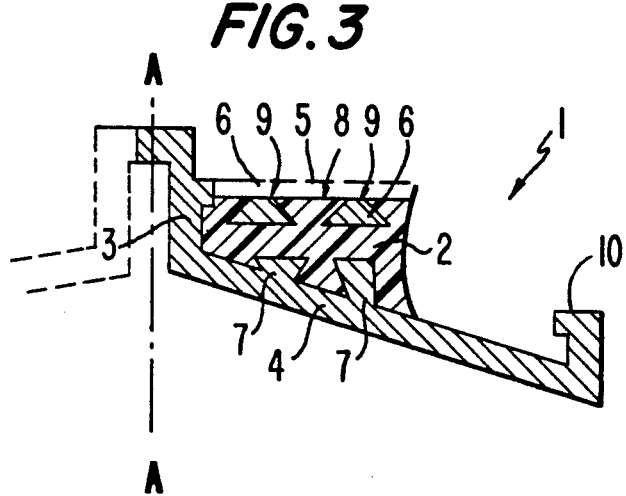
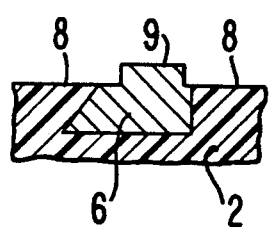
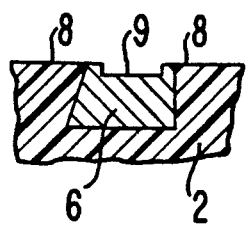

ASSEMBLY INCLUDING A LIGHT ALLOY PROFILED MEMBER HAVING ONE OR MORE INSULATED ELECTRICAL CONDUCTORS AND PROCESS FOR FORMATION THEREOF

BACKGROUND OF THE INVENTION

The present invention relates to an assembly including a light alloy profiled section or member, and more particularly such a section made of aluminum or an aluminum alloy, including one or more insulated electrical conductors, as well as to a process for formation thereof.

Profiled sections obtained by extruding or drawing aluminum or an aluminum alloy have a cross-sectional shape defined by their own function/application, e.g. structural elements such as beams and frames, rails, ducts, vehicle body elements, etc. For some of these profiled sections it is particularly desirable to have one or more insulated electrical conductors integrated with the sections to provide energy or signal transport circuits. Currently, this is obtained by introducing commercial electrical cables into such sections; namely, cables having one or more conductors with generally at least one insulating sheath. It is obvious that the insertion of such an electrical cable into a profiled section constitutes a time-consuming, fastidious and extremely expensive operation comprising several steps which cannot be entirely mechanized and automated.

From U.S. Pat. No. 4,217,018 there is known an electrical supply track comprising a channel-shaped steel casing lined inwardly and outwardly with a synthetic resin and provided with a pair of supporting members molded integrally with the inner resin layer for embedding of exposed (bare) conductive members.

Obviously there is no possibility for an integrated in-line low cost manufacturing of supply tracks by the disclosed method comprising separate steps of bending of a steel plate into a channel shape, coating of shaped surfaces, providing integrally molded supporting members and finally insertion of the exposed conductive members into the supporting members.

FR No. 1,253,131 discloses, in connection with provision of an improved trolley line, a band comprising a series of parallel electrical conductors with exposed surfaces being cast into an insulating matrix and subsequently fastened by gluing to a metallic section. Once again, this is a laborious manufacturing multi-step process resulting in expensive products and probably also an inferior contact between the band and metallic section.

SUMMARY OF THE INVENTION

The object of the present invention is to overcome the above drawbacks and to provide an assembly including a light alloy profiled section or member having one or more insulated electrical conductors, the assembly of the profiled section and the conductors being integrally formed during manufacture using a process with several operating phases which may be entirely mechanized and automated, as well as to a process for the formation of such assembly.

Another object of the present invention is to provide an improved intimate adhesion between the insulated conductors and the surrounding profile section.

In accordance with the invention a light alloy profiled section comprises at least one linear electrical conductor extending parallel in the longitudinal direction of the profiled section, being formed from the same material as the profiled section, and being insulated electrically in a solid filling exhibiting a bare surface, and which itself has a bare surface oriented in the same general direction as that of the filling.

Also in accordance with the invention, when the profiled section is at an intermediate stage corresponding to its being drawn or extruded, it comprises at least two permanent walls and a temporary dividing wall, whose inner faces form a cavity for receiving the filling in a non-solid state, the inner face of the temporary dividing wall having longitudinal parallel sections for forming the insulated electrical conductors retained in the filling in the solid state after removal of the dividing wall, the inner face of at least one of the two walls having parallel longitudinal projections ensuring an intimate and firm contact between the walls and the solid filling.

According to other features of the invention the bare surface of one or more electrical conductors may be flush with, project from or be retracted with respect to the bare surface of the insulating filling. Furthermore, at its end opposite its bare surface, each electrical conductor may have in cross-section an enlarged portion in the filling.

According to yet another feature of the invention the bare surface of the electrical conductors may be insulated wholly or partly by means of a second filling, the latter being possibly formed by an electrically insulating material identical to that of the first filling.

BRIEF DESCRIPTION OF THE DRAWINGS

Other features and advantages of the present invention will be more apparent from the following description of several possible embodiments, given by way of examples only, with reference to the accompanying drawings, where;

FIG. 1 is a cross-sectional view of a profiled section with a single electrical conductor;

FIG. 2 is a cross-sectional view of a profiled section with a plurality of electric conductors;

FIG. 3 is a partial cross-sectional view of another embodiment of a profiled section symmetrically disposed with respect to an axis AA;

FIG. 4 is a partial cross-sectional view of a conductor projecting with respect to a filling; and FIG. 5 is a partial cross-sectional view of a conductor retracted with respect to the filling.

DETAILED DESCRIPTION OF THE INVENTION

Referring to FIGS. 1-3, a light alloy profiled section or member is designated generally by 1 and is obtained by extruding or drawing aluminum or an aluminum alloy. As mentioned above, this profiled section has a cross-sectional shape defined by its own function, e.g. a structural member, as shown schematically in FIG. 1.

This profiled section comprises at leas cavity for receiving a filling 2 formed of an electrically insulating material, e.g. a polymer resin such as quick setting polyurethane resin, such insulating filling being poured into the cavity and hardened in situ. For this purpose each cavity of the profiled section 1 is formed by the inner faces of two permanent walls 3, 4 and a temporary dividing wall 5, the latter being subsequently removed by mechanical machining, e.g. by grinding, planing or by milling, and being shown simply defined by dot-dash lines in FIGS. 1-3.

It should be noted that, before pouring the electrically insulating filling 2, it is possible to subject the profiled section 1 to all the usual surface treatments, such as e.g. the application of a primer or a lacquer or the formation of an anodic oxidation.

The inner face of the temporary dividing wall 5 has longitudinal parallel projections 6 and the inner face of at least one of the two permanent walls 3, 4 also has longitudinal parallel projections 7, the dividing wall 5 and the two walls 3 and 4 being integrally and simultaneously formed with their associated projections during the drawing or extrusion process. Each projection 6 or 7 has a cross-section perpendicularly enlarging from the walls, e.g: in the form of a T, a dovetail or a half dovetail to ensure a rigid and intimate connection between the projections and the filling 2 when the filling has hardened and has become solid. This configuration is especially important for the projections 6 associated with the temporary dividing wall 5, projections 6 being intended to form insulated electrical conductors after removal of dividing wall 5 by mechanical machining, as mentioned above. Consequently, the projections 6 must have a cross-section not only with a sufficiently large area to allow current to pass (proper dimension), but also an appropriate form so that they are held in position with respect to the filling, e.g. a generally trapezoidal cross-section.

Furthermore, apart from providing the necessary mechanical strength, it is important that an intimate adhesion between the electrical conductors, insulating filling and the surrounding permanent walls of the profiled sections is achieved in order to improve the thermal conductivity and thus the dissipation of heat generated in the conductors during transport of electrical energy.

After complete hardening of the filling, the temporary dividing wall 5 shown with dash-dot lines in FIGS. 1-3 may be entirely removed by mechanical machining, particularly grinding, planing or milling, or by any other suitable process which simultaneously eliminates any protective layer previously applied by a surface treatment. This operation bares both the outer surface 8 of the electrically insulating filling 2 and outer surface 9 of the projections 6. Each projection 6 is thus transformed into a linear electrical conductor parallel to the longitudinal direction of the profiled section 1 and insulated electrically in filling 2 which holds the projection firmly retained because of the shape of its cross-section.

It is obvious that the surface 9 of each conductor 6 is oriented in the same general direction as the bare surface 8 of the insulating filling 2. Furthermore, the bare surfaces 9 and 8 are usually flush with each other, which simplifies machining. However, it may be desirable for the bare surface 9 of one or more conductors 6 to project from the bare surface 8 of the insulating filling 2, as shown in FIG. 4, or on the contrary, for the bare surface 9 of one or more conductors 6 to be retracted or recessed with respect to the bare surface 8 of filling 2, as shown in FIG. 5. These results may be obtained in one or more with particular suitable grinding or milling tools.

By way of example, referring more particularly to FIG. 1, the permanent walls 3 and 4 are parallel or disposed facing one another and are joined together by a temporary dividing wall 5 forming a bridge, the whole having the approximate shape of a U or H. In this case, the two walls 3 and 4 must obviously have facing projections 7 so as to remain fast with the filling 2 after removal of dividing wall 5. In the case shown the assembly has a single electrical conductor 6 parallel to the profiled section.

Referring to FIG. 2, the permanent walls 3 and 4 form a right angle and it is then sufficient for a single of such walls to include projections 7, preferably the wall which is parallel to the dividing wall 5 forming the third face of the cavity. In, the case shown in FIG. 2, the assembly includes a set of five small electrical conductors parallel to each other and parallel to the other elements of the profiled section.

Referring to FIG. 3, showing an assembly including a profiled section 1 symmetrically disposed with respect to axis AA, the walls 3 and 4 form an obtuse angle. In this case the right-hand half of the assembly which is shown includes two electrical power conductors and the complementary left-hand half, not shown, could also includes two conductors, the assembly corresponding for example to a star connection with neutral leadout. Furthermore, it is possible to apply, by clipping or sliding at the level of a hook means 10, an insulating protective cover, not shown, covering the left and right-hand parts of the assembly.

It is then apparent that the parallel electrical conductors thus formed may fulfil numerous functions relative to electrical energy transport circuits or to control, safety, biassing or other circuits.

It should be noted that in the particular case where the two walls 3, 4 and the dividing wall 5 form an H-shaped assembly, it is possible for special applications to pour a second insulating filling 11 (defined by broken lines in FIG. 1), so that the bare surface 9 of the conductor(s) can be insulated over the entire section length or partially by a filling layer, being formed, if required, by a material identical to that of the first filling 2.

In this connection it may be useful to give the temporary dividing wall 5 a curved or angular shape, not shown, so that after removal of dividing wall 5 by machining, the bare surfaces of filling 2 and of conductor 6 form a second cavity with a sufficient depth to allow a second filling to be poured entirely covering the bare surfaces of the conductors retained in the first filling.

Furthermore, it is obvious that all the above operations, namely drawing or extrusion, surface treatment, pouring and hardening of the filling, mechanical machining and, possibly, pouring and hardening of a second filling, are operations which may be entirely mechanized and automated and conducted in-line with the extrusion process.

The present invention has of course been described and shown solely by way of non-limitative examples, and any useful modifications may be made thereto, particularly in the field of technical equivalences, without departing from its scope and spirit.

I claim:
1. An assembly comprising:
 a linearly elongated profiled section of light alloy material, said section including linearly elongated, integrally connected walls defining a cavity, at least one of said walls having integral therewith linearly elongated parallel projections extending into said cavity;
 an electrically insulating material molded into said cavity and solidified therein to from a solidified insulating filling that is intimately adhered to said section by said projections being rigidly embedded in said solidified insulating filling; and at least one linearly elongated conductor intimately adhered to and embedded in said solidified insulating filling, said conductor being of the identical light alloy material as said section, being electrically insulated therefrom and being employable as an insulated conductor insulated by said solidified insulating filling, and extending parallel to said section said at least one conductor and said solidified insulating filling having respective bared outer surfaces.

2. An assembly as claimed in claim 1, wherein said projections on said at least one wall of said section have a cross-sectional configuration enlarged in a direction away from said at least one wall.

3. An assembly as claimed in claim 2, wherein said cross-sectional configuration is trapezoidal defined by surfaces diverging from each other in said direction.

4. An assembly as claimed in claim 1, wherein said at least one conductor has a cross-sectional configuration enlarged in a direction away from said outer surface thereof.

5. An assembly as claimed in claim 4, wherein said cross-sectional configuration is trapezoidal defined by surfaces diverging from each other in said direction.

6. An assembly of claimed in claim 1, wherein said bared outer surface of said conductor is flush with said bared outer surface of said solidified insulating filling.

7. An assembly as claimed in claim 1, wherein said bared outer surface of said conductor projects outwardly of said bared outer surface of said solidified insulating filling.

8. An assembly as claimed in claim 1, wherein said bared outer surface of said conductor is recessed inwardly of said bared outer surface of said solidified insulating filling.

9. An assembly as claimed in claim 1, further comprising a cover of electrically insulating material at least partially insulating said bared outer surface of said conductor.

10. An assembly as claimed in claim 9, wherein said outer cover entirely insulates and covers said bared outer surface of said conductor.

11. An assembly as claimed in claim 9, wherein said insulating material of said cover is the same as said insulating material of said solidified insulating filling.

12. An assembly as claimed in claim 1, comprising a plurality of said conductors extending parallel to each other.

13. An assembly as claimed in claim 1, wherein plural walls of said section have respective said projections extending into said cavity and rigidly embedded in said solidified insulating filling.

14. A process of forming an assembly including a linearly elongated section of light alloy material and at least one linearly elongated electrical conductor of identical light alloy material electrically insulated from said section and capable of use as an insulated conductor, said process comprising:

extruding or drawing as a unitary, integral structure said linearly elongated section including linearly elongated, integrally connected walls and a linearly elongated provisional wall connected to at least one of said walls of said section, such that said walls and said provisional wall define a cavity, with at least one of said walls having integral therewith linearly elongated parallel projections extending into said cavity, and with said provisional wall having integral therewith at least one linearly elongated projection extending into said cavity;

molding an electrically insulating material into said cavity and solidifying said insulating material to form a solidified insulating filling intimately adhered to said section and to said provisional wall by said projections being rigidly embedded in said solidified insulating filling; and removing said provisional wall, thereby maintaining said at least one projection thereof rigidly embedded in said solidified insulating material as said at least one conductor electrically insulated from said section and employable as an insulated conductor insulated by said solidified insulating filling, and also thereby baring respective outer surfaces of said at least one conductor and said solidified insulating filling.

15. A process as claimed in claim 14, comprising forming said projections on said at least one wall of said section to have a cross-sectional configuration enlarged in a direction away from said at least one wall.

16. A process as claimed in claim 15, wherein said cross-sectional configuration is trapezoidal defined by surfaces diverging from each other in said direction.

17. A process as claimed in claim 14, comprising forming said at least one conductor to have a cross-sectional configuration enlarged in a direction away from said outer surface thereof.

18. A process as claimed in claim 17, wherein said cross-sectional configuration is trapezoidal defined by surfaces diverging from each other in said direction.

19. A process as claimed in claim 14, comprising forming said bared outer surface of said conductor to be flush with said bared outer surface of said solidified insulating filling.

20. A process as claimed in claim 14, comprising forming said bared outer surface of said conductor to project outwardly of said bared outer surface of said solidified insulating filling.

21. A process as claimed in claim 14, comprising forming said bared outer surface of said conductor to be recessed inwardly of said bared outer surface of said solidified insulating filling.

22. A process as claimed in claim 14, further comprising forming a cover of electrically insulating material to at least partially insulate said bared outer surface of said conductor.

23. A process as claimed in claim 22, comprising forming said cover to entirely insulate and cover said bared outer surface of said conductor.

24. A process as claimed in claim 22, wherein said insulating material of said cover is the same as said insulating material of said solidified insulating filling.

25. A process as claimed in claim 14, comprising forming a plurality of said conductors extending parallel to each other.

26. A process as claimed in claim 14, comprising forming plural walls of said section to have respective said projections extending into said cavity and rigidly embedded in said solidified insulating filling.

* * * * *